UNITED STATES PATENT OFFICE.

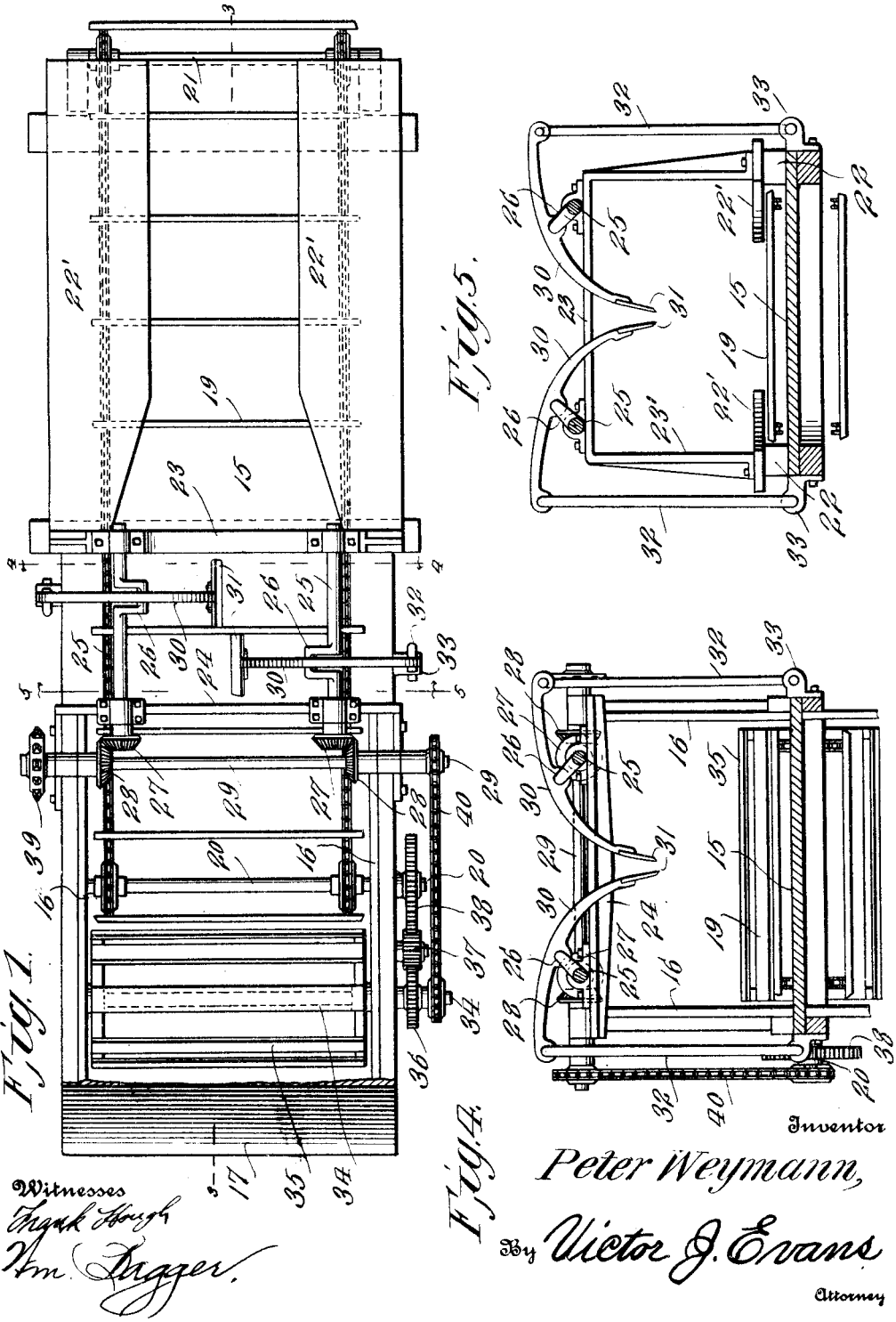

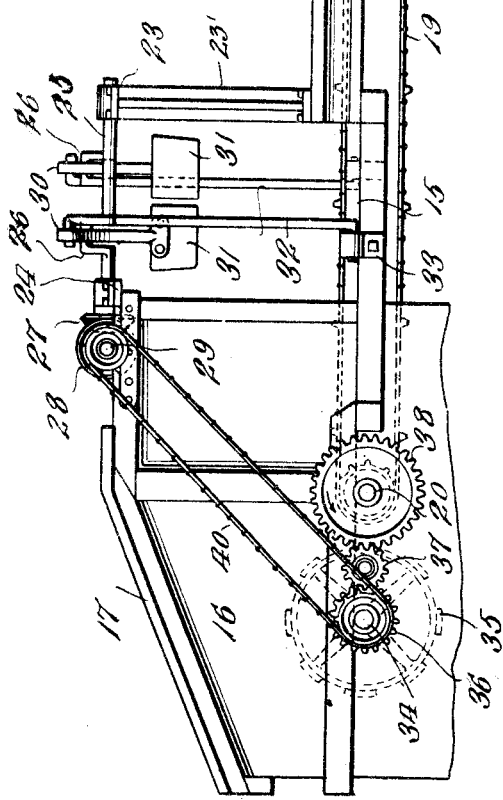

PETER WEYMANN, OF MELROSE, MINNESOTA.

FEEDING DEVICE FOR CORN-SHREDDERS.

1,141,736.     Specification of Letters Patent.     Patented June 1, 1915.

Application filed April 10, 1914. Serial No. 831,012.

*To all whom it may concern:*

Be it known that I, PETER WEYMANN, a citizen of the United States, residing at Melrose, in the county of Stearns and State of Minnesota, have invented new and useful Improvements in Feeding Devices for Corn-Shredders, of which the following is a specification.

This invention relates to automatic feeding devices for corn shredding machines, reference being had to that class of machines which are used for shredding and disintegrating corn stalks for feeding purposes.

The invention has for its object to produce a simple and efficient device whereby the bands of bundles of stalks will be cut and the stalks be spread out so as to be presented to the shredder in a relatively thin layer, whereby the shredding operation will be facilitated and better results will be obtained than when the stalks are fed by hand.

A further object of the invention is to produce a simple and efficient feeding device, whereby the corn stalks as they are being fed to the shredder will be so manipulated with respect to the shredding mechanism so as to facilitate and improve the operation of said shredding mechanism.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being however, understood that no limitation is necessarily made to the precise structural details therein exhibited, but that changes, alterations and modifications within the scope of the claims may be resorted to when desired.

In the drawings,—Figure 1 is a top plan view of a feeding device constructed in accordance with the invention. Fig. 2 is a side elevation of the same. Fig. 3 is a longitudinal sectional view taken on the line 3—3 of Fig. 1. Fig. 4 is a transverse sectional view taken on the line 4—4 in Fig. 1. Fig. 5 is a transverse sectional view taken on the line 5—5 in Fig. 1.

Corresponding parts in the several figures are denoted by like characters of reference.

The bed or table 15 of the improved feeder is provided with side flanges 16 and with an inclined top member 17 combining to form a housing adjacent to the receiving end of the shredding machine, said receiving end being represented by the hopper-shaped casing 18. An endless carrier or conveyer 19 is trained over shafts 20, 21 adjacent to the ends of the bed or table, the latter being provided with guide members of L-shaped cross section, including cleats 22 and flanges 22′ extending therefrom, between and beneath which the conveyer is guided and between the lateral flanges 22′ of which bundles of corn may be introduced and placed on the conveyer. The latter may be of any well known chain and slat construction or of any construction that will enable it to carry the bundles of corn along.

The L-shaped guide members are interrupted at a suitable distance from the flanges 16 of the housing, and adjacent to said flanges or uprights 23′ is supported a cross bar 23; another cross bar 24 is secured on the flanges 16. These cross bars afford bearings for shafts 25 having cranks 26 and provided at their rearward ends with bevel gears 27 meshing with bevel pinions 28 on a shaft 29 which is supported for rotation on the side flanges 16 near the forward ends of the latter. Supported on each crank 26 is an arm 30 carrying at its inner end a broad hoe-shaped cutting blade 31. The outer ends of the arms 30 are connected by links 32 with bearings 33 on the sides of the bed or table 15. It follows from this construction that when the shafts 29 are rotated, the cutter at each side will be carried through an orbital course, the blade being moved transversely with respect to the conveyer while the cutting edge of the blade is disposed longitudinally with respect to the conveyer, thus causing said cutting edge to engage and cut the bands whereby the bundles are tied, while the blade serves also to spread or distribute the corn stalks over the entire width of the bed or table of the machine.

Supported for rotation in the side flanges 16 near the rearward end of the device is a shaft 34 carrying a reel 35, said shaft carrying also a pinion 36 meshing with a driving gear 37 which in turn meshes with a pinion 38 on the shaft 20 over which the rearward end of the endless conveyer is trained and from which the reel derives its motion.

The shaft 29 has been shown as being provided with a sprocket wheel 39 for the purpose of receiving motion from some moving part of the shredder in connection with which the feeder is used. A chain 40 may be utilized for transmitting motion from the shaft 29 to the shaft 34 carrying the driving pinion 36, thereby transmitting motion to the endless conveyer and to the reel.

In the operation of this device the bundles of corn are placed on the conveyer between the guides 22, and the bundles are carried by the conveyer beneath the cutting and spreading members, whereby the bands are cut, and the stalks are distributed evenly over the conveyer to be carried by the latter until engaged by the reel, whereby the stalks are flattened out and fed to the shredder in the best condition to be efficiently operated upon.

It will be observed that the guides composed of the elements 22 and 22' whereby the endless conveyer 19 is guided are interrupted adjacent to the uprights 23' that support the cross bar 23 which, together with the cross bar 24, carries the crank shafts 25 whereby the cutting and spreading members are actuated, thus permitting said cutting and spreading members to swing more closely to the face of the upper lead of the conveyer than would be possible if the guide flanges were not interrupted. The corn stalks may thus be spread more thinly and evenly from the face of the conveyer, and the operation of the device is thereby materially improved.

Having thus described the invention, what is claimed as new, is:—

1. In a feeder for shredding machines, a frame, an endless conveyer, guides for said conveyer, crank shafts supported longitudinally above the conveyer, combined cutting and spreading members pivoted on the cranks of said shaft and having blades movable transversely of the conveyer and the cutting edges of which are disposed longitudinally with respect to the conveyer, and links connecting the outer ends of said cutting and spreading members with the frame; the guides of the conveyer being interrupted in the path of the cutting and spreading members, in combination with means for actuating the conveyer and the crank shafts.

2. In a machine of the class described, the combination with a conveyer and a frame whereon said conveyer is guided, of crank shafts supported longitudinally above the same, cutting and spreading members including arms pivoted on the cranks of said shafts, and broad hoe-shaped cutting blades fixed on the inner ends of said arms, movable transversely of the conveyer and having cutting edges disposed longitudinally with respect to the conveyer, links connecting the outer ends of said arms with the frame, and means for actuating the conveyer and for rotating the crank shafts in opposite directions imparting to the cutting and spreading members orbital movements whereby they will be caused to sweep over the top face of the conveyer transversely toward the outer edges of the latter.

In testimony whereof I affix my signature in presence of two witnesses.

PETER WEYMANN.

Witnesses:
A. H. KLASEN,
J. A. LOHR.